United States Patent
Elharrar et al.

(10) Patent No.: US 10,817,221 B2
(45) Date of Patent: Oct. 27, 2020

(54) STORAGE DEVICE WITH MANDATORY ATOMIC-ONLY ACCESS

(71) Applicant: International Business Machines Corporation, Armonk, NY (US)

(72) Inventors: Yair Elharrar, Ramat-Gan (IL); Deborah A. Messing, Beit Shemesh (IL); Rivka Mayraz Matosevich, Zichron Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/274,101

(22) Filed: Feb. 12, 2019

(65) Prior Publication Data
US 2020/0257470 A1    Aug. 13, 2020

(51) Int. Cl.
*G06F 12/02* (2006.01)
*G06F 3/06* (2006.01)

(52) U.S. Cl.
CPC .......... *G06F 3/0659* (2013.01); *G06F 3/0619* (2013.01); *G06F 3/0631* (2013.01); *G06F 3/0673* (2013.01)

(58) Field of Classification Search
CPC ............. G06F 12/0815; G06F 13/1631; G06F 13/1652; G06F 9/466; G06F 9/3004; H05K 7/1498
See application file for complete search history.

(56) References Cited

U.S. PATENT DOCUMENTS

| | | | |
|---|---|---|---|
| 4,837,680 A | | 6/1989 | Crockett et al. |
| 5,446,862 A | * | 8/1995 | Ohkami .............. G06F 13/1652 710/240 |
| 5,978,813 A | | 11/1999 | Foltz et al. |
| 6,769,072 B1 | | 7/2004 | Kawamura et al. |
| 7,171,538 B2 | | 1/2007 | Kisley et al. |
| 7,509,523 B2 | | 3/2009 | Agombar et al. |
| 9,384,065 B2 | | 7/2016 | Fortin |
| 9,652,350 B2 | | 5/2017 | Astigarraga et al. |
| 2007/0150671 A1 | * | 6/2007 | Kurland ............... G06F 9/3004 711/154 |
| 2008/0320253 A1 | * | 12/2008 | Tomlin .................... G06F 9/466 711/155 |
| 2009/0292885 A1 | * | 11/2009 | Molgaard ........... G06F 13/1631 711/152 |
| 2011/0179082 A1 | | 7/2011 | Vaghani et al. |
| 2014/0344503 A1 | * | 11/2014 | Deguchi ............. G06F 12/0815 711/103 |
| 2019/0065083 A1 | * | 2/2019 | Sen ...................... H05K 7/1498 |

\* cited by examiner

*Primary Examiner* — Ryan Bertram
*Assistant Examiner* — Trang K Ta
(74) *Attorney, Agent, or Firm* — Kunzler Bean & Adamson

(57) ABSTRACT

For preventing implementation errors due to misconfigured host applications, a storage controller provisions a storage destination with a capability identifier configured to indicate that the storage destination mandates atomic write operations. The storage controller also receives a write request for the storage destination from host application, and rejects, in response to the received request including a non-atomic write operation, the non-atomic write request.

20 Claims, 4 Drawing Sheets

US 10,817,221 B2

STORAGE DEVICE WITH MANDATORY ATOMIC-ONLY ACCESS

FIELD

The subject matter disclosed herein relates to data storage and more particularly relates to storage area networks that implement atomic and non-atomic write operations.

BACKGROUND

Today with modern technology, large volumes of data are storable on disk drives; these drives can exist as a solo entity, or as part of a broader make up within a larger storage environment, for example as part of a Storage Area Network (SAN). As the sheer volume of data in today's information-based society continues to increase, so too does the demand placed on communications and data processing infrastructures that serve to manipulate, transfer, and otherwise handle this data.

Multiple and various types of devices need to access the data stored on the storage devices, and to ensure that data isn't corrupted by simultaneous writes to the same segment of data, many SANs implement atomic test-and-set or mutually-exclusive locks. Unfortunately, the SAN relies on the application that issued the write request to honor the "atomicity" of the data segment. If the application is misconfigured critical data may be overwritten.

BRIEF SUMMARY

A method for ensuring data integrity of data stored on storage devices that require atomic write operations is disclosed. An apparatus and computer program product also perform the functions of the method. In certain embodiments, the method includes provisioning a storage destination with a capability identifier configured to indicate that the storage destination mandates atomic write operations, receiving a write request for the storage destination from host application, and rejecting, in response to the received request including a non-atomic write operation, the non-atomic write request.

The method, in certain embodiments, also includes issuing, in response to the received write request including a non-atomic write operation, a write-failure message to the host application. In some embodiments, the capability identifier is further configured to indicate that the storage destination does not mandate atomic write operations, or to indicate that only a portion of the storage destination mandates atomic-only write operations. The method may also include determining if the received write request includes a partial atomic write operation.

In certain embodiments, the capability identifier comprises a value stored in a configuration area of the storage destination. The storage destination may be a storage device or a storage volume.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
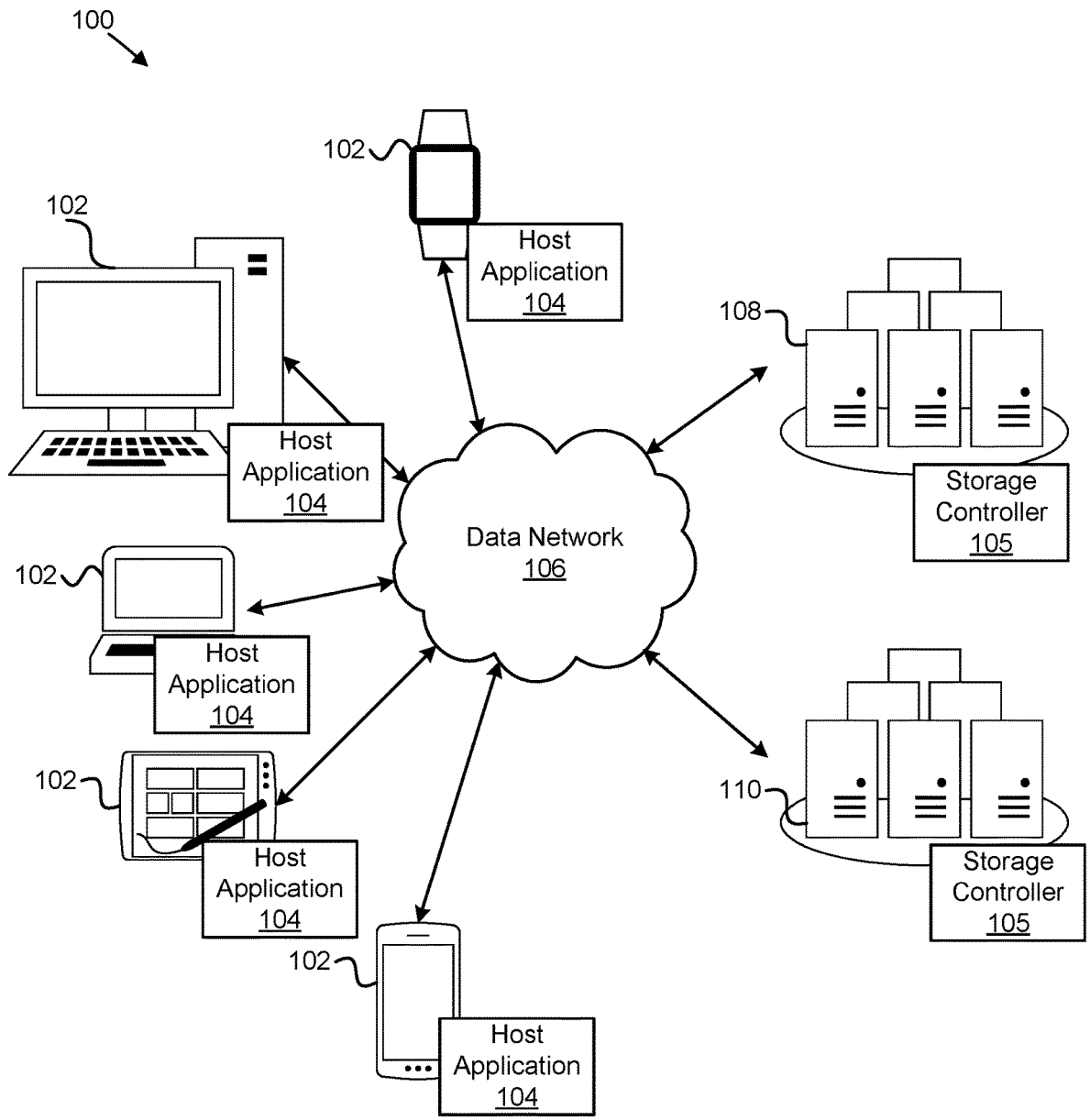
FIG. 1 depicts one embodiment of a system for utilizing a communication system to access storage repositories in accordance with embodiments of the present disclosure.

Disclosed herein are various embodiments providing methods, systems, and computer program products that can ensure that critical sections of data residing on storage devices, that require atomic write operations, are not overwritten by non-atomic methods. The language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present technology are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the FIGs. illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure may refer to elements of proceeding figures. Like numbers refer to like elements in all figures, including alternate embodiments of like elements.

FIG. 1 depicts one embodiment of a system 100 for utilizing a communication system to access storage repositories in accordance with embodiments of the present disclosure. In one embodiment, the system 100 includes one or more information handling devices 102, one or more host applications 104, one ore more storage controllers 105, one or more data networks 106, one or more primary data repositories 108, and/or one or more secondary data repositories 110. In certain embodiments, even though a specific number of information handling devices 102, host applications 104, storage controller 105, data networks 106, primary data repositories 108, and secondary data repositories 110 are depicted in FIG. 1, one of skill in the art will recognize, in light of this disclosure, that any number of information handling devices 102, host applications 104, storage controllers 105, data networks 106, primary data repositories 108, and secondary data repositories 110 may be included in the system 100.

In one embodiment, the information handing devices 102 may include one or more of a server, a desktop computer, a laptop computer, a tablet computer, a smart phone, a set-top box, a gaming console, or another computing device comprising a processor (e.g., a central processing unit (CPU), a processor core, a field programmable gate array (FPGA) or other programmable logic, an application specific integrated circuit (ASIC), a controller, a microcontroller, and/or another semiconductor integrated circuit device), a volatile memory, and/or a non-volatile storage medium. In certain embodiments, the information handling devices 102 are communicatively coupled to the primary data repository 108 and/or a secondary data repository 110 via a data network 106, described below. The information handling devices 102, in a further embodiment, are capable of executing various programs, program code, applications, instructions, functions, or the like, which may access, store, download, upload, and/or the like data located on the primary data repository 108 and/or the secondary data repository 110.

The primary data repository 108, in one embodiment, may comprise one or more servers, or other data storage devices, that include volatile and non-volatile storage media for storing data. The data may include documents, images, videos, audio files, metadata, or the like. The data may be stored in a file system, as objects, as blocks, and/or the like. The primary data repository 108 may be located in a data center either on the premises of an organization and/or in the cloud such that data is accessed via a data network 106 like the Internet. The primary data repository 108, in one embodiment, is the primary data storage point for one or more entities, applications, programs, and/or the like for storage and access of data used by the one or more entities, applications, programs, and/or the like. The data stored on the primary data repository 108 may be stored in a compressed format, e.g., the data may be compressed using various data compression methods such as data deduplication.

Similarly, the secondary data repository 110 may comprise one or more servers, or other storage devices, that include volatile and non-volatile storage media for storing data. The data may include documents, images, videos, audio files, metadata, or the like. The data may be stored in a file system, as objects, as blocks, and/or the like. The secondary data repository 110 may store data received from the primary data repository 108, e.g., the data may be "pushed," automatically or manually, from the primary data repository 108 to the secondary data repository 110. The secondary data repository 110 may be located in a data center either on the premises of an organization and/or in the cloud such that data is accessed via a data network 106 like the Internet. The secondary data repository 110, in one embodiment, is configured as a backup storage system, a disaster recovery system, a data restore system, and/or the like.

In one embodiment, the storage controller 105 is configured to provision storage volumes or devices with an indication that the provisioned storage volume or device only accepts atomic write commands. Stated differently, the storage controller 105 is configured to provision a storage device or volume where atomic test-and-set commands are mandatory for writing to the device, volume, or a defined portion of either. As used herein, an atomic read or write operation refers to an operation that is uninterruptible and will be executed completely without any other process being able to read or change an element that is being accessed by the atomic read or write operation. Previously, it was the responsibility of the host application 104 to respect atomic-only requirements, and a misconfigured host application 104 could potentially overwrite atomic-only data in a non-atomic method that causes data inconsistencies. Beneficially, the storage controller 105 is configured to provision the storage device or storage volume with an "atomic-only" capability flag (or other indicator) that restricts write access to the device or volume. Any write operation to the device or volume with is not atomic will fail, and the storage controller 105 is configured to notify the host application 104 of the failure. The storage controller 105 may be configured with error codes to notify the application host 104 of the failure.

In various embodiments, the storage controller 105 may be embodied as a hardware appliance that can be installed or deployed in a primary data repository 108, a secondary data repository 110, on an information handling device 102, or elsewhere on the data network 106. In certain embodiments, the storage controller 105 may comprise a hardware device such as a secure hardware dongle or other hardware appliance device (e.g., a set-top box, a network appliance, or the like) that attaches to device of the primary data repository 108, the secondary data repository 110, another information handling device 102, such as a laptop computer, a server, a tablet computer, a smart phone, or the like, either by a wired connection (e.g., a USB connection) or a wireless connection (e.g., Bluetooth®, Wi-Fi®, near-field communication (NFC), or the like); that attaches to an electronic display device (e.g., a television or monitor using an HDMI port, a DisplayPort port, a Mini DisplayPort port, VGA port, DVI port, or the like), and/or the like. A hardware appliance of the storage controller 105 may comprise a power interface, a wired and/or wireless network interface, a graphical interface that attaches to a display, and/or a semiconductor integrated circuit device as described below, configured to perform the functions described herein with regard to the storage controller 105.

The storage controller 105, in such an embodiment, may comprise a semiconductor integrated circuit device (e.g., one or more chips, die, or other discrete logic hardware), or the like, such as a field-programmable gate array (FPGA) or other programmable logic, firmware for an FPGA or other programmable logic, microcode for execution on a microcontroller, an application-specific integrated circuit (ASIC), a processor, a processor core, or the like. In one embodiment, the storage controller 105 may be mounted on a printed circuit board with one or more electrical lines or connections (e.g., to volatile memory, a non-volatile storage medium, a network interface, a peripheral device, a graphical/display interface. The hardware appliance may include one or more pins, pads, or other electrical connections configured to send and receive data (e.g., in communication with one or more electrical lines of a printed circuit board or the like), and one or more hardware circuits and/or other electrical circuits configured to perform various functions of the storage controller 105.

The semiconductor integrated circuit device or other hardware appliance of the storage controller 105, in certain embodiments, comprises and/or is communicatively coupled to one or more volatile memory media, which may include but is not limited to: random access memory (RAM), dynamic RAM (DRAM), cache, or the like. In one embodiment, the semiconductor integrated circuit device or other hardware appliance of the storage controller 105 comprises and/or is communicatively coupled to one or more non-volatile memory media, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), magnetic storage media (e.g., hard disk, tape), optical storage media, or the like.

The data network 106, in one embodiment, includes a digital communication network that transmits digital communications. The data network 106 may include a wireless network, such as a wireless cellular network, a local wireless network, such as a Wi-Fi network, a Bluetooth® network, a near-field communication (NFC) network, an ad hoc network, and/or the like. The data network 106 may include a wide area network (WAN), a storage area network (SAN), a local area network (LAN), an optical fiber network, the internet, or other digital communication network. The data network 106 may include two or more networks. The data network 106 may include one or more servers, routers, switches, and/or other networking equipment. The data network 106 may also include one or more computer readable storage media, such as a hard disk drive, an optical drive, non-volatile memory, RAM, or the like.

Figure 2:
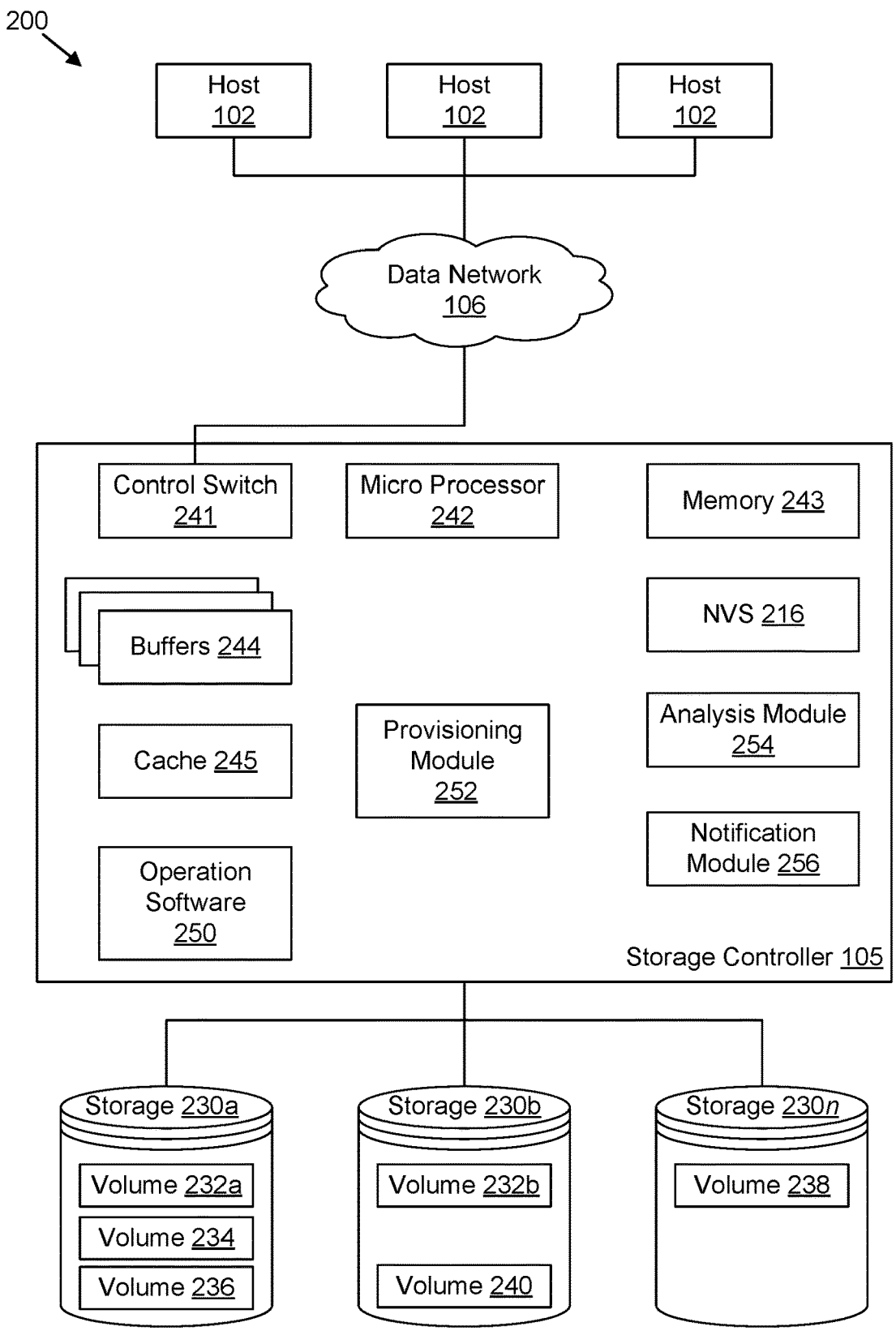
FIG. 2 is block diagram illustrating another embodiment of a system utilizing a communication system to access storage repositories in accordance with embodiments of the present disclosure.

FIG. 2 is block diagram illustrating another embodiment of a system 200 utilizing a communication system to access storage repositories in accordance with embodiments of the present disclosure. In particular, the system 200 includes a data storage and management system (specifically, portions of a SAN) that may be used in the overall context of mandatory atomic operations in accordance with the present invention. Information handling devices ("hosts") 102 are shown, each acting as a central processing unit for performing data processing as part of the data storage system 200. The cluster hosts/nodes (physical or virtual devices) 102 may be one or more new physical devices or logical devices to accomplish the purposes of the present disclosure in the data storage system 200.

The data network 106, as described above, may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 102 may be local or distributed among one or more locations and may be equipped with any type of fabric (or fabric channel) (not shown in FIG. 2) or network connection to the storage controller 105, such as Fibre channel, FICON, ESCON, Ethernet, fiber optic, wireless, or coaxial adapters. Data storage system 200 is depicted in FIG. 2 comprising storage controllers 105 and cluster hosts 102. The cluster hosts 102 may include cluster nodes and other network components known to one of ordinary skill in the art.

To facilitate a clearer understanding of the methods described herein, the storage controller 105 is shown in FIG. 2 as a single processing unit, including a microprocessor 242, system memory 243 and nonvolatile storage ("NVS") 216. It is noted that in some embodiments, the storage controller 105 may include multiple processing units, each with their own processor complex and system memory, and interconnected by a dedicated network within the system 200.

Storage (referred to jointly as "storage 230" and labeled as 230a, 230b, and 230n herein) may be comprised of one or more storage devices, such as storage arrays. The storage 230 devices are connected to the storage controller 105 (by a storage network), with one or more cluster hosts 102 connected to each storage controller 105 through the data network 106. While one data connection between components is shown for purposes of brevity, one of ordinary skill in the art will appreciate that any reasonable number of network connections, or "paths" may be found in a particular system or scenario in which data is transferred. These paths form the multipath architecture of storage networks in which the mechanisms of the present invention are concerned, among other aspects. In addition, alternate network paths appreciated by one of ordinary skill in the art may be found.

In some embodiments, the devices included in the storage 230 may be connected in a loop architecture. The storage controller 105 manages the storage 230 and facilitates the processing of write and read requests intended for the storage 230. The system memory 243 of the storage controller 105 stores program instructions and data, which the processor 242 may access for executing functions and method steps of the present invention for executing and managing the storage 230 as described herein. In one embodiment, the system memory 243 includes, is in association with, or is in communication with, the operation software 250 for performing methods and operations described herein. As shown in FIG. 2, the system memory 243 may also include or be in communication with a cache 245 for storage 230, also referred to herein as a "cache memory", for buffering "write data" and "read data", which respectively refer to write/read requests and their associated data. In one embodiment, the cache 245 is allocated in a device external to the system memory 243, yet remains accessible by the microprocessor 242 and may serve to provide additional security against data loss, in addition to carrying out the operations as described in herein.

In some embodiments, the cache 245 is implemented with a volatile memory and nonvolatile memory and coupled to the microprocessor 242 via a local bus (not shown in FIG. 2) for enhanced performance of the data storage system 200. The NVS 216 included in the storage controller 105 is accessible by the microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS 216 may be stored in and with the cache 245 for any purposes suited to accomplish the objectives of the present invention. In some embodiments, a backup power source (not shown in FIG. 2), such as a battery, supplies the NVS 216 with sufficient power to retain the data stored therein in case of power loss to data storage system 200. In certain embodiments, the capacity of the NVS 216 is less than or equal to the total capacity of the cache 245. Buffers 244 assist the cache 245 to read and write data, and a control switch 241 controls a protocol to control data transfer to or from the storage devices 230, the hosts 102, and other components in the storage controller 105. Multiple buffers 244 may be implemented with the present invention to assist with the operations as described herein.

The storage 230 may be physically comprised of one or more storage devices, such as storage arrays. A storage array is a logical grouping of individual storage devices, such as a hard disk. In certain embodiments, the storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, by way of example only, the storage system as shown in FIG. 2 may include a logical volume, or simply "volume," and may have different kinds of allocations. Storage 230a, 230b, etc., and 230n are shown as ranks in the data storage system 200, and are referred to herein as rank 230a, 230b and 230n. Ranks may be local to the data storage system 200, or may be located at a physically remote location. In other words, a local storage controller 105 may connect with a remote storage controller and manage storage at the remote location. The rank 230a is shown configured with two entire volumes, 234 and 236, as well as one partial volume 232a. The rank 230b is shown with another partial volume 232b. Thus volume 232 is allocated across ranks 230a and 230b. The rank 230n is shown as being fully allocated to volume 238—that is, the rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a specific rank.

The storage controller 105 may include operation software 250, provisioning module 252, an analysis module 254, and a notification module 256. The operation software 250, provisioning module 252, analysis module 254, and notification module 256 may work in conjunction with each and every component of the storage controller 105, the 102, and the storage devices 230. The operation software 250, the provisioning module 252, the analysis module 254, and the notification module 256 may be structurally one complete module or may be associated and/or included with other individual modules. The operation software 250, provisioning module 252, analysis module 254, and notification module 256 may also be located in the cache 245 or other components of the storage controller 105.

The operation software 250, provisioning module 252, analysis module 254, and notification module 256 may individually and/or collectively perform various aspects of the present invention as will be further described. For example, the operation software 250 may contain executable code for performing mandatory atomic write operations. In certain embodiments, the provisioning module 252 is configured to provision an entire storage device with an indicator that the entire storage device requires that any write operation is atomic. The provisioning module 252 is also configured to provision a portion of the storage device as mandatory "atomic-only." Likewise, the provisioning module 252 may provision a storage volume (that may span multiple storage devices), or a portion of the storage volume, as mandatory "atomic-only." In certain embodiments, the provisioning module 252 creates an atomic-only flag in a configuration area (e.g., configuration file) of the storage device. The configuration area may also include information such as size, serial number, firmware version, etc. The indicator (or capability flag) may also indicate whether the entire storage device or volume is designated as mandatory atomic-only, or whether only a portion thereof is mandatory atomic-only.

The analysis module 254 is configured to analyze, upon receiving a write request, whether the received write request is either a "not atomic," or an "atomic" write request. The analysis module 254, in certain embodiments, analyzes the target destination of the write request and determines if the target destination has been flagged as atomic-only, or not atomic. If the write request is not an atomic write request, and the target destination (i.e., storage volume or storage device) is flagged as "atomic-only," the storage controller 105 blocks the write request, and the notification module is configured to notify the originating host 102 of the reason for the failure. This beneficially notifies the administrator that his/her application may be misconfigured while safeguarding critical data from being overwritten in a nonatomic manner. In one embodiment, the notification module 256 may be configured with new SCSI and/or NVMe error sense codes to inform the originating host 102 application of the cause of the failure.

In certain embodiments, the analysis module 254 is configured to notify the storage controller 105 if a requested write operation targets an area of the storage device or volume that is a mix of areas that are configured as atomic-only and not atomic. For example, assume a volume is 1000 blocks in size, where blocks 60-99 are defined as atomic-only; a non-atomic write starting at 300 is therefore acceptable, while a 10-block non-atomic write starting at 80 (up to 89) is not acceptable, and a 20-block non-atomic write starting at 50 (up to 69) partially intersects with the atomic-only range. In this example, the analysis module 254 is configured to either allow an execution of a partial write (50-59) or to reject the entire write operation. However, in either situation, the storage controller 105 is configured to not allow a write to the atomic-only range (60-69) by a non-atomic write operation.

In view of the exemplary hardware structures depicted in FIGS. 1 and 2 previously, the mechanisms of the present invention may, as one of ordinary skill in the art will appreciate, be implemented and/or utilized in a wide variety of physical locations including, but not limited to Host-Bus Adapters (HBAs), Converged Network Adapters (CNAs), switch ports, storage ports, and the like. The mechanisms of the illustrated embodiments, among other functionality, implement new methodologies to ensure data is not corrupted by misconfigured host applications, storage drivers, filesystem control software, or other general operating system issues. Critical sections residing within the storage volumes or devices that have a mandatory atomic-write indicator can no longer be overwritten by a non-atomic method.

Figure 3:
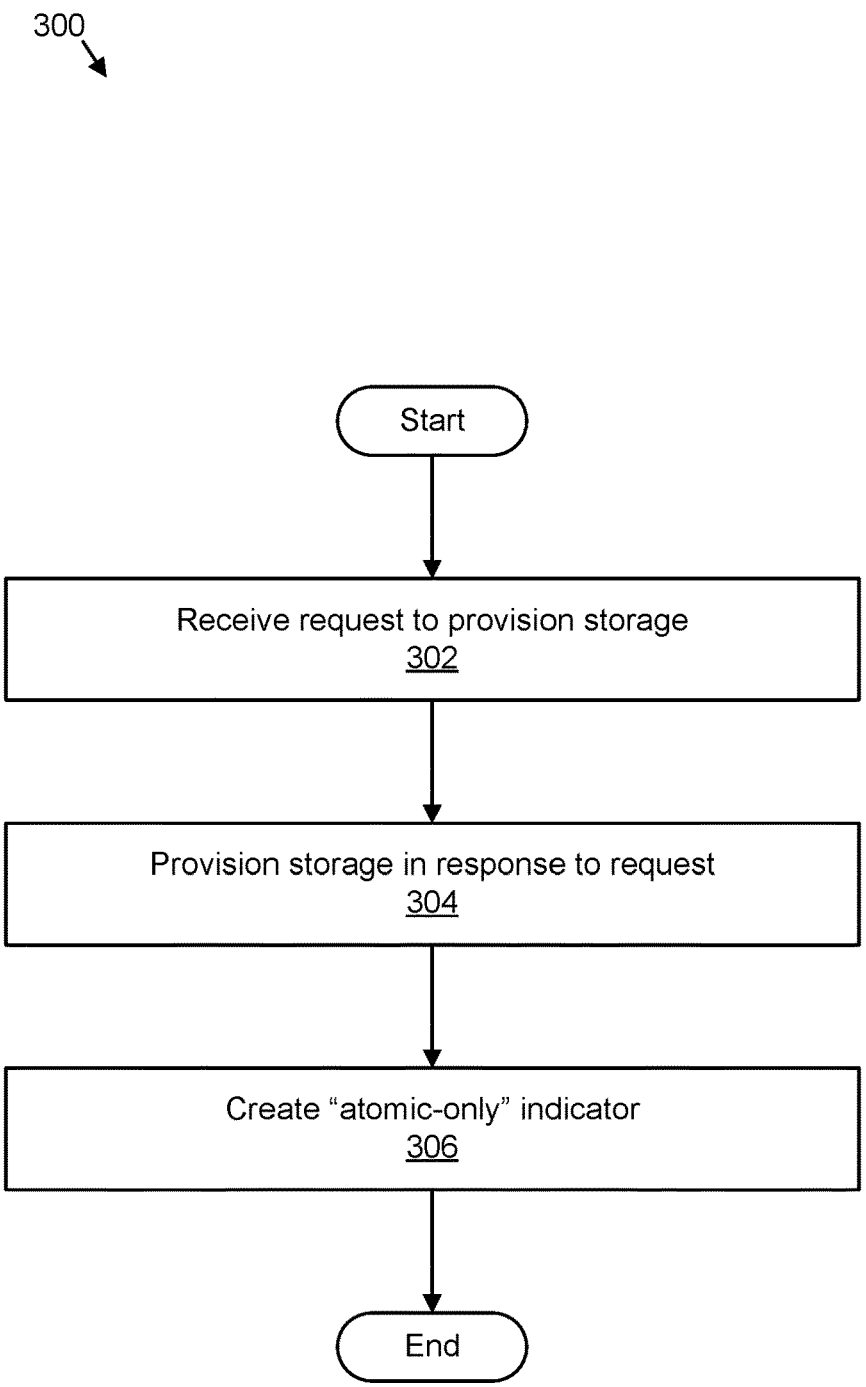
FIG. 3 is a flowchart diagram illustrating one embodiment of a method for provisioning a storage volume or device as mandatory atomic-only.

FIG. 3 is a flowchart diagram illustrating one embodiment of a method 300 for provisioning a storage volume or device as mandatory atomic-only. In other words, the method 300 depicts the steps which may be performed to initialize a storage device or volume, or a portion thereof. Previously, storage volumes or devices relied on the proper configuration of the host application to know whether the data was flagged as atomic or not atomic. The method 300 may be performed by processing logic that may comprise hardware (e.g., circuitry, dedicated logic, programmable logic, microcode, etc.), software (such as instructions run on a processing device), firmware, or a combination thereof. In one embodiment, the method 300 is performed by the storage controller 105.

The method 300 starts and the processing logic, at block 302 receives a request to provision a storage device or storage volume. As described above, an entire storage device or storage volume may be flagged as atomic-only, or a portion (e.g., a track) thereof. In one embodiment, receiving a request to provision a storage device or storage volume includes receiving a request that identifies a particular storage location, common storage configurations (e.g., size, etc.), and an atomic capability value (e.g., "not atomic" or "atomic-only").

At block 304, the processing logic provisions the storage according to the identified configuration. The processing logic also sets the atomic capability value according to the requested/identified configuration. In certain embodiments, the processing logic, at block 306, creates a capability value as part of the metadata of the storage drive or volume. This capability value indicates whether the entire storage device or volume, or a portion thereof, is to be mandated atomic-only or not. The method 300 then ends.

Figure 4:
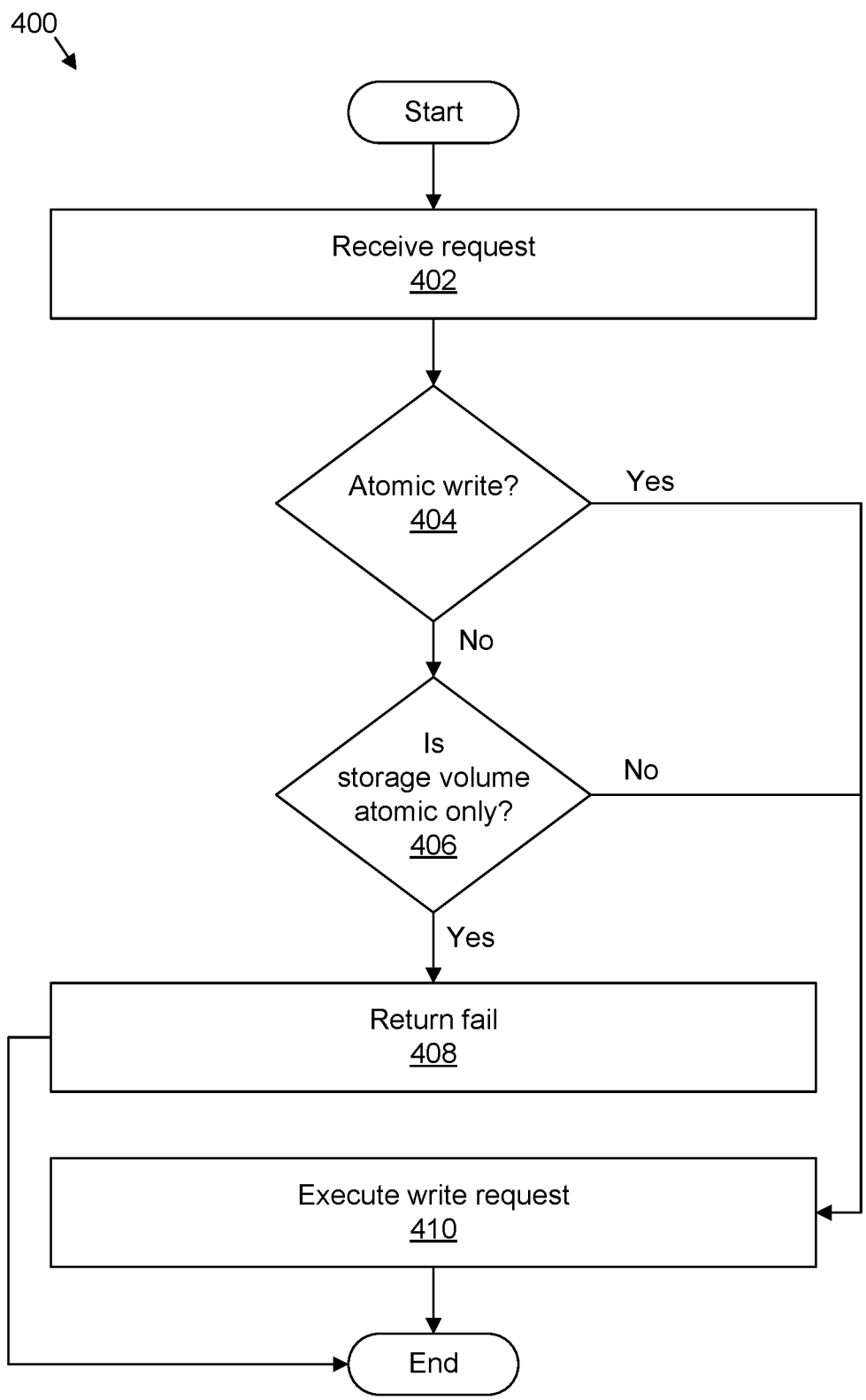
FIG. 4 is a flowchart diagram illustrating one embodiment of a method for mandatory atomic write operations in accordance with embodiments of the present disclosure.

FIG. 4 is a flowchart diagram illustrating one embodiment of a method 400 for mandatory atomic write operations in accordance with embodiments of the present disclosure. In other words, the method 400 depicts the steps which may be performed after a storage volume or device has been provisioned as "atomic-only.' The method 400 may be performed by processing logic that may comprise hardware (e.g., circuitry, dedicated logic, programmable logic, microcode, etc.), software (such as instructions run on a processing device), firmware, or a combination thereof. In one embodiment, the method 400 is performed by the storage controller 105.

The method 400 starts and the processing logic, at block 402 receives, from a host application for example, a write request. At decision block 404, the processing logic determines the write-request type. In certain embodiments, there are at least two possible write-request types: (1) atomic-only, and (2) not atomic. If the write request is "not atomic", the processing logic, at decision block 406, determines if the requested target storage device has an indicator identifying the target as "atomic only." If yes, the processing logic returns a failure code, at block 408, to the originating host application. The failure code may be a standard SCSI error code, for example, or a newly defined or custom error sense code.

If, at decision block 404, the processing logic determines that the write request is an atomic write request, the processing logic executes the write request at block 410. Similarly, the processing logic executes the write request if the determination at decision block 406 is no. The method 400 then ends.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   one or more processors;
   one or more non-transitory computer-readable storage media, the one or more non-transitory computer readable storage media comprising executable code, that when executed by the one or more processors, causes the one or more processors to:
      provision a storage destination with a capability identifier configured to indicate that the storage destination mandates atomic write operations;
      receive a write request for the storage destination from host application; and
      reject, in response to the received request including a non-atomic write operation, the non-atomic write request without executing the received request.

2. The apparatus of claim 1, where the executable code further causes the one or more processors to, in response to the received request including a non-atomic write operation, issue a write-failure message to the host application.

3. The apparatus of claim 1, where the capability identifier is further configured to indicate that the storage destination does not mandate atomic write operations.

4. The apparatus of claim 1, where the capability identifier is further configured to indicate that only a portion of the storage destination mandates atomic-only write operations.

5. The apparatus of claim 1, where the executable code further causes the one or more processors to determine if the received write request includes an atomic write operation.

6. The apparatus of claim 1, where the executable code further causes the one or more processors to determine if the received write request includes a partial atomic write operation.

7. The apparatus of claim 1, where the capability identifier comprises a value stored in a configuration area of the storage destination.

8. The apparatus of claim 1, where the storage destination comprises a storage device.

9. The apparatus of claim 1, where the storage destination comprises a storage volume.

10. A method comprising:
provisioning a storage destination with a capability identifier configured to indicate that the storage destination mandates atomic write operations;
receiving a write request for the storage destination from host application; and
rejecting, in response to the received request including a non-atomic write operation, the non-atomic write request without executing the received request.

11. The method of claim 10, where the method further comprises issuing, in response to the received write request including a non-atomic write operation, a write-failure message to the host application.

12. The method of claim 10, where the capability identifier is further configured to indicate that the storage destination does not mandate atomic write operations.

13. The method of claim 10, where the capability identifier is further configured to indicate that only a portion of the storage destination mandates atomic-only write operations.

14. The method of claim 10, where the method further comprises determining if the received write request includes a partial atomic write operation.

15. The method of claim 10, where the capability identifier comprises a value stored in a configuration area of the storage destination.

16. The method of claim 10, where the storage destination comprises a storage device.

17. The method of claim 10, where the storage destination comprises a storage volume.

18. A computer program product, the computer program product comprising a non-transitory computer readable storage medium having program instructions embodied therewith, the program instructions readable/executable by a processor to cause the processor to:
provision a storage destination with a capability identifier configured to indicate that the storage destination mandates atomic write operations;
receive a write request for the storage destination from host application; and
reject, in response to the received request including a non-atomic write operation, the non-atomic write request without executing the received request.

19. The computer program product of claim 18, where the program instructions cause the processor to, in response to the received request including a non-atomic write operation, issue a write-failure message to the host application.

20. The computer program product of claim 18, where the capability identifier is further configured to indicate that the storage destination does not mandate atomic write operations.

* * * * *